United States Patent [19]

Sugiyama et al.

[11] Patent Number: 5,462,586
[45] Date of Patent: Oct. 31, 1995

[54] OIL-AND WATER REPELLENT GAS-PERMEABLE FILTER

[75] Inventors: Norihide Sugiyama, Yokohama; Masaru Nakamura, Tokyo; Sumihiro Moriyama; Fumihiro Sasaki, both of Okayama, all of Japan

[73] Assignee: Japan Gore-Tex, Inc., Japan

[21] Appl. No.: 301,529

[22] Filed: Sep. 7, 1994

[30] Foreign Application Priority Data

Sep. 8, 1993 [JP] Japan .................................. 5-223185
Sep. 20, 1993 [JP] Japan .................................. 5-233249

[51] Int. Cl.$^6$ .......................... B01D 71/36; B01D 69/12
[52] U.S. Cl. ........................ 96/13; 96/14; 55/524
[58] Field of Search .................. 55/524, 528; 96/11–14

[56] References Cited

U.S. PATENT DOCUMENTS

| | | | |
|---|---|---|---|
| 5,105,579 | 4/1992 | Fukazawa et al. | 96/12 X |
| 5,116,650 | 5/1992 | Bowser | 428/34.2 |
| 5,286,279 | 9/1994 | Wu | 96/12 X |

FOREIGN PATENT DOCUMENTS

| | | |
|---|---|---|
| 0073087 | 3/1983 | European Pat. Off. . |
| 0391660 | 10/1990 | European Pat. Off. . |
| 60-039482 | 3/1985 | Japan . |
| 63-238111 | 10/1988 | Japan . |
| 63-238115 | 10/1988 | Japan . |
| 9101791 | 2/1991 | WIPO . |
| WO94/22561 | 10/1994 | WIPO ........................ 96/13 |

*Primary Examiner*—Robert Spitzer
*Attorney, Agent, or Firm*—Gary A. Samuels

[57] ABSTRACT

An oil- and water-repellent filter which contains a porous filter material that has its internal and external surfaces coated with a compound formed by combining a fluoropolymer having a fluorine-containing aliphatic cyclic structure in the main chain and a fluoropolymer containing polyfluoroalkyl groups. The coating imparts superior oil- and water-repellency without impairment to the flow of air or other gases through the filter.

6 Claims, No Drawings

OIL- AND WATER REPELLENT GAS-PERMEABLE FILTER

FIELD OF THE INVENTION

The present invention relates to a gas-permeable filter which has both oil- and water-repellent characteristics. More particularly, the invention relates to gas filters and vents in which a porous material of the filter is coated with a compound of fluoropolymers which imparts oil- and water-repellent properties to the porous material.

BACKGROUND OF THE INVENTION

As a result of improvements in materials and technology, and the current trend towards miniaturization and portability, electronic and mechanical devices for personal and industrial use are becoming sensitive to an increasing number of materials that can adversely affect their performance and are increasingly being installed, or carded into, and used in environments which contain such materials.

When possible, such devices are contained in sealed enclosures and are not exposed to the ambient environment. However, in most cases, it is desirable for the enclosures and housings containing sensitive mechanical or electronic equipment to have openings that permit easy passage of gases, such as air, through them. This may be desirable for transmission of sound, for example, in the case of cordless telephones, transceiver radios, pagers, loudspeakers, and the like; or for the purpose of accomodating or controlling changes in temperature and pressure in devices such as modern cameras with auto-focussing or zoom lenses, computers, analytical instruments, automobile electronic controls, pressure sensors and pressure switches, and the like.

In these cases it is necessary to protect the sensitive components of the devices from contact with harmful elements present in the ambient environment. This is usually done by installation of a filter in the vents, or openings, in the enclosure to serve as a barrier to harmful particulates, liquids, or aerosols present in most environments. Porous membranes of hydrophobic materials such as polytetrafluoroethylene or other fluoropolymers, or polyolefin polymers, have been used as vent filter materials, and are well known in the art. Also, other synthetic polymers in the form of woven or non-woven fabrics, mesh, netting, or felts treated with water-repellent coatings have been used as water-repellent gas-permeable filter materials. Filters containing these materials can provide good barrier properties against passage of particles, water, or water mist. However, such materials generally lack oil-repellency and, when contacted by oils, may become plugged or blinded so that gas-permeability is lost; or if contacted with many water-soluble oils, detergents, surfactants, and the like, may lose their water-repellency.

Because of the ubiquitous presence of oils and their aerosols in many environments, for example, lubricating oil and grease, power steering fluid, brake fluid, etc., in automotive environments; cooking oils, food fats and oils, kitchen detergents, human body oils, etc., in home, business, and restaurant environments; and the many oils, solvents, surfactants, and other chemicals, etc., in industrial environments; it has become desirable to have filters that also have oil-repellent properties. U.S. Pat. No. 5,116,650 (to Bowser) discloses porous materials which have oleophobic properties developed in them by coating the pore interiors with a coating of an amorphous copolymer of tetrafluoroethylene and perfluoro-2,2-dimethyl-1,3-dioxole.

SUMMARY OF THE INVENTION

It is an object of the invention to provide a filter material that is gas permeable and has good oil- and water-repellent properties. The inventors have discovered that by combining a fluoropolymer that has excellent oil- and water-repellent properties but poor membrane-forming and wear properties, with a second fluoropolymer that has good membrane-forming and durability properties but relatively poor oil-repellent properties, a compound can be formed that can be coated on a porous material in such a way that porosity is minimally diminished, and good, durable oil- and water-repellent properties are imparted to the porous material.

Specifically, the invention is for an oil- and water-repellent gas-permeable filter comprising a gas-permeable material having a structure containing passageways therethrough. The gas-permeable material has its internal and external surfaces coated with a compound comprising a first fluoropolymer (Type A fluoropolymer) having a fluorine-containing aliphatic cyclic structure in the main chain, and a second fluoropolymer (Type B fluoropolymer) containing polyfluoroalkyl groups. The relative concentration of fluoropolymers in the compound is in the range 1 part by weight (pbw) Type A fluoropolymer to 0.01–100 pbw Type B fluoropolymer. Preferably, the Type B fluoropolymer contains at least 80 wt-% acrylate or methacrylate monomer groups having $C_nF_{2n+1}$ (where n=4 to 20) as the polyfluoroalkyl groups.

In one preferred embodiment of the invention the gas-permeable material is a composite material comprising a porous polytetrafluoroethylene membrane laminated to a material selected from the class consisting of woven fabric, knitted fabric, non-woven fabric, netting, felt, porous synthetic polymer sheets, cellulosic papers, and fiberglass papers.

By "gas-permeable material" is meant a porous material that permits bulk flow of air or other gases through it; in contrast to a non-porous material in which gas permeation is controlled by diffusion mechanisms.

By "porous" as used herein is meant to describe materials that allow passage of gases, especially air. These are materials that compose pores and voids that form passages extending through the thickness of the material. The passageways open on both sides of the material, and may be interconnected internally.

DETAILED DESCRIPTION OF THE INVENTION

The porous material of the filter of the invention can be made of a broad variety of materials so long as the material is porous and gas permeable as defined above. The porous material can be made of natural or synthetic materials such as, but not limited to, woven fabric, knitted fabric, non-woven fabric, netting, felt, etc., or porous sheets of synthetic polymers, cellulosic paper, or fiberglass paper, and the like. The materials can be used singly, or multiply, such as in laminated composite articles, and may be in the form of sheet, tube, or plug. A variety of additives, such as ultraviolet radiation stabilizers, coloring agents, plasticizers, antistatic agents, antibacterial agents, and the like, can be present in the porous material as processing aids or to endow particular properties, provided they do not adversely affect the final product. Selection of appropriate materials and forms will be made according to end use requirements such as filtration requirements, physical, chemical, and mechanical properties required, use environment, cost of materials and manufacturing, etc.

Porous materials of synthetic polymers can be used. Fluoropolymers, including tetrafluoroethylene/(perfluoroalkyl) vinyl ether copolymer (PFA), tetrafluoroethylene/hexafluoropropylene copolymer (FEP), and polytetrafluoroethylene (PTFE), and the like, are preferred for their processing characteristics, temperature resistance, and chemical inertness. Most preferred are porous materials of polytetrafluoroethylene.

Porous polytetrafluoroethylene sheet, rods, or tubing suitable for use in the invention can be made by processes known in the art, for example, by stretching or drawing processes, by papermaking processes, by processes in which filler materials are incorporated with the PTFE resin and which are subsequently removed to leave a porous structure, or by powder sintering processes. Preferably the porous polytetrafluoroethylene material is porous expanded polytetrafluoroethylene sheet, rods, or tubing having a structure of interconnected nodes and fibrils, as described in U.S. Pat. Nos. 3,953,566 and 4,187,390 which fully describe the preferred material and processes for making them. The porous polytetrafluoroethylene material should have a nominal pore size in the range 0.01 to 15 micrometers. Air permeability should be 1000 Gurley Number or less, preferably 600 Gurley Number or less, as determined by the test described hereinbelow.

In the course of experimentation it was found that a gas-permeable material can be coated with a fluorine-containing polymer containing polyfluoroalkyl groups in such a way that excellent oil- and water-repellency can be imparted to the gas-permeable material without compromising its gas-permeability. However, it was found that the fluoropolymer had poor membrane-forming properties and did not adequately form a coherent coating around the internal and external structure of the gas-permeable material, and did not exhibit adequate wear resistance and durability.

On the other hand, fluoropolymers containing a fluorine-containing aliphatic cyclic structure that have good membrane-forming properties, high mechanical strength, and excellent water-repellent properties were known for their use as coatings on printed circuit boards, dies, nozzles for ink-jet printers, and the like. However, the fluoropolymers containing a fluorine-containing aliphatic cyclic structure have poor oil-repellency compared to fluorine-containing polymers containing polyfluoroalkyl groups.

Hereinafter, for ease and clarity, fluoropolymers having a fluorine-containing aliphatic cyclic structure in the main chain may be described as Type A fluoropolymers; and fluoropolymers containing polyfluoroalkyl groups may be described as Type B fluoropolymers. As will be shown below, by combining the two types of fluoropolymers described above, a compound was formed that had membrane-forming characteristics needed to form a durable coherent coating and provided satisfactory oil- and water-repellency.

Examples of suitable Type A fluoropolymers include polymers which are obtained by cyclic polymerization of fluorine-containing monomers having at least two polymerizable double bonds, or those obtained by polymerization of monomers having fluorine-containing cyclic structures.

Type A fluoropolymers which are obtained by polymerization of monomers having a fluorine-containing cyclic structure are disclosed in European Patent Application No. 0 073 087 (to Squire). They may be obtained by homopolymerization of polymers having fluorine-containing cyclic structures, such as perfluoro-(2,2-dimethyl-1,3-dioxole), or by copolymerization with radical polymerizable monomers such as tetrafluoroethylene.

Type A fluoropolymers which are obtained by the cyclic polymerization of fluorine-containing monomers having at least two polymerizable double bonds are taught in Japanese Laid-Open Pat. Applications Nos. 63-238111 and 63-238115. Specifically, they may be obtained by cyclic polymerization of monomers such as perfluoro-(allyl vinyl ether) or perfluoro-(butenyl vinyl ether), or by copolymerization with radical polymerizable monomers such as tetrafluoroethylene.

Type A fluoropolymers may also be obtained by copolymerization of a monomer having a fluorine-containing cyclic structure such as perfluoro-(2,2-dimethyl-1,3-dioxole) and a fluorine-containing monomer having at least two polymerizable double bonds such as perfluoro-(allyl vinyl ether) or perfluoro-(butenyl vinyl ether).

It is desirable from the standpoint of oil- and water-repellency, mechanical properties, and the like, that the Type A fluoropolymer have at least 20 mol-% of the cyclic structure in the monomer repeating units. The molecular weight of the Type A fluoropolymer should be 0.01 to 3.0 dL/g, as expressed in terms of the intrinsic viscosity. An intrinsic viscosity that is too low results in poor membrane-forming properties, whereas an intrinsic viscosity that is too high results in poor solubility of the polymer in a solvent. The glass transition temperature (Tg) of the Type A fluoropolymer should be at least 40° C. lower than the softening or deformation temperature of the porous gas-permeable material on which it is to be coated. It is also desirable that the Type A fluoropolymer contain end groups that react with, or have an affinity for, the porous material on which they will be coated in order to more firmly bond to the porous material, and thus providing greater durability in use. Examples of suitable end groups include, but are not limited to, carboxylic acids, carboxylic acid esters, carboxylic acid fluorides, silyl-modified carboxylic acids, and the like.

The Type B fluoropolymer of the present invention is a homopolymer obtained by radical polymerization of an $\alpha,\beta$-unsaturated monomer containing at least one polyfluoroalkyl group; or a copolymer of an $\alpha,\beta$-unsaturated monomer containing at least one polyfluoroalkyl group and a radical polymerizable unsaturated monomer. Hereinafter a polyfluoroalkyl group may be referred to as "Rf group"; and the radical polymerizable unsaturated monomer as "comonomer."

The $\alpha,\beta$-unsaturated monomers containing polyfluoroalkyl groups have structures in which the Rf groups are bonded, either directly or via divalent bond groups, with polymerizable unsaturated groups. Structures containing straight chain or branched alkyl or alkenyl groups in which the hydrogen atoms in the hydrocarbon radicals have been substituted with fluorine atoms can be selected as the Rf group structure. Such structures may also contain oxygen atoms that are ether-bonded with carbon atoms. The number of carbons in the Rf groups can range from 1 to 20, preferably from 4 to 16.

The Rf groups are groups containing two or more fluorine atoms, and should be groups in which at least 80 wt-% of the atoms bonded to the carbon atoms are fluorine atoms. Other atoms besides fluorine and hydrogen atoms may be bonded to the carbon atoms. Chlorine atoms are preferred as such atoms.

When the Rf groups are groups containing oxygen atoms ether-bonded to carbon atoms, the groups should contain an oxyfluoroalkylene component in the structure. The group may also contain a structure in which two or more oxyfluoroalkylenes are joined. Examples of such oxyfluoroalkylene components include oxyfluoroethylene and oxyfluoropropylene.

The end component structure of the Rf groups may be selected from trifluoromethyl groups, difluoromethyl groups, chlorodifluoromethyl groups, and the like. Trifluoromethyl groups are preferred.

Optimal polyfluoroalkyl groups are polyfluoroalkyl groups in which all of the hydrogen atoms have been substituted with fluorine atoms (hereinafter referred to as perfluoroalkyl groups). The perfluoroalkyl groups should have a straight chain structure and should have a carbon number of 4 to 16, preferably 6 to 12.

The Rf groups described above are bonded with polymerizable unsaturated groups, either directly or via divalent bond groups. Examples of divalent bond groups include, but are not limited to, $-COOR^2-$, $COOR^2N(R^3)SO_2-$, $COOR^2N(R^3)CO-$, and the like. Here $R^2$ is an alkylene group, ordinarily an alkylene group with a carbon number of 2 to 6, preferably a carbon number of 2. $R^2$ may also be an alkylene group containing an ether-bonded oxygen, phenylene group, or the like. An alkyl group, halogen atom, or the like, may also be bonded to the alkylene group. $R^3$ expresses an alkyl group, preferably with a carbon number of 1 to 4.

Examples of suitable α,β-unsaturated monomers containing polyfluoroalkyl groups are shown in Formula List 1 below, however, the list is not limiting as other suitable monomers can be used. Acrylate and methacrylate monomers have good polymerizing properties and are thus ideal. In the list below, $R^1$ is a hydrogen atom or methyl group, and φ is a phenylene group. Rf" is a perfluoroalkyl group with a carbon number of 4 to 16.

FORMULA LIST 1

$CH_2=C(R^1)COOCH_2CH_2Rf"$ $CH_2=C(R^1)COOCH(CH_3)CH_2Rf"$ $CH_2=C(R^1)COOCH_2CH_2N(CH_3)CORf"$ $CH_2=C(R^1)COOCH_2CH_2N(C_2H_5)CORf"$ $CH_2=C(R^1)COOCH_2CH_2N(C_3H_7)CORf"$ $CH_2=C(R^1)COOCH_2CH_2N(CH_3)SO_2Rf"$ $CH_2=C(R^1)COOCH_2CH_2N(C_3H_7)SO_2Rf"$ $CH_2=C(R^1)COOCH_2(CH_2Cl)CH_2OCH_2CH_2N(CH_3)SO_2Rf"$ $CH_2=C(R^1)COOCH_2CH_2+CH_2OCH_2CH_2CH_2Rf"$ $CH_2=C(R^1)Rf"$

No particular restrictions are imposed on the comonomer used to form the Type B fluoropolymer of the invention provided that it has radical polymerizable unsaturated groups. For example, the comonomer may be selected from acrylates, methacrylates (hereinafter the term "(meth)acrylate" refers to both acrylates and methacrylates; similarly for other compounds), (meth)acrylic amides, (meth)acrylonitriles, vinyls, olefins, and other such monomers having radical polymerizable unsaturated groups. One, two, or more of such monomers may be contained in the Type B fluoropolymer.

Specific examples of suitable comonomers include, but are not limited to, the following:

2-ethylhexyl (meth)acrylate, stearyl (meth)acrylate, cyclohexyl (meth)acrylate, (meth)acrylic acid, polyoxyalkylene (meth)acrylate, glycidyl (meth)acrylate, benzyl (meth)acrylate, isocyanate ethyl (meth)acrylate, aziridinyl (meth)acrylate, hydroxyalkyl (meth)acrylate, and (meth)acrylate containing a polysiloxane component;

(meth)acrylamide, diacetone (meth)acrylamide, methylolated (meth)acrylamide, vinyl acetate, vinyl chloride, vinyl fluoride, vinyl alkyl ether, halogenated alkyl vinyl ethers, vinyl alkyl ketones, N-vinyl carbazole, ethylene, butadiene, isoprene, chloroprene, styrene, α-methyl styrene, p-methyl styrene, and maleic anhydride.

Of these comonomers, vinyl chloride and/or stearyl (meth)acrylates such as stearyl acrylate and stearyl methacrylate are preferred.

The amount of α,β-unsaturated monomer containing at least one polyfluoroalkyl group copolymerized with such comonomers above should be at least 60 wt-%, and preferably at least 80 wt-%.

In the present invention, the homopolymerization of α,β-unsaturated monomers containing Rf groups, or the copolymerization thereof with comonomers, can be done by solution polymerization in a fluorine-containing solvent, emulsion polymerization in an aqueous medium, or suspension polymerization in an aqueous medium. This homopolymerization or copolymerization is usually implemented in the presence of a conventional radical polymerization initiator, or a mixture of two or more such initiators, known in the art. The radical polymerization initiator is ordinarily used in an amount of 0.01 to 3 weight parts, and preferably 0.1 to 1.5 weight parts, per 100 weight parts of the total monomer. The number average molecular weight of the Type B fluoropolymer should be in the range 1,000 to 1,000,000. A number average molecular weight of 1,000 to 200,000 is particularly desirable for solubility and dispersibility of the fluoropolymer in solvents.

The Type A and Type B fluoropolymers are then combined by dissolving or uniformly dispersing them in a solvent to form a coating solution. The concentration ratio between the fluoropolymers is generally in the range 1 weight part Type A fluoropolymer to 0.01 to 100 weight parts Type B fluoropolymer, but this ratio can be varied as desired depending on the application of the end product, treatment method, or the like. A ratio of 1 weight part Type A fluoropolymer to 0.5 to 20 weight parts Type B fluoropolymer is preferred, and even more preferred is a ratio of 1 weight part Type A fluoropolymer to 2 to 10 weight parts Type B fluoropolymer.

The combined Type A and Type B fluoropolymers can be prepared in order to form a coating solution using an organic solvent or as an aqueous emulsion. The solvent used to form the coating solution should be one in which the Type A and Type B fluoropolymer can be dissolved or uniformly dispersed. Preferably, a fluorine-containing solvent is used.

Suitable fluorine-containing solvents include, but are not limited to, perfluorobenzene, hexafluorometaxylene and such polyfluoroaromatic compounds, perfluorotributylamine, perfluorotripropylamine and such polyfluorotrialkylamine compounds, perfluorohexane, perfluorooctane, (perfluoro-n-octyl) ethane, perfluoro-(2,3,5-trimethylhexane), and other such polyfluoroalkane compounds, (perfluoro-n-octyl) ethylene and such polyfluoroolefin compounds, perfluorocyclohexane, perfluorodecalin and such polyfluorocycloalkane compounds, perfluoro-(2-butyltetrahydrofuran) and such polyfluorocyclic ether compounds; trichlorotrifluoroethane and such chlorofluorocarbons, 1,3-dichloro-1,1,2,2,3-pentafluoropropane, 1,1-dichloro-2,2,3,3,3-pentafluoropropane and such chlorofluorohydrocarbons, fluorine-containing low molecular weight polyethers, and the like. These solvents can be used individually or in mixtures.

For coating the porous materials forming the filter of the invention with a compound comprising the Type A and Type B fluoropolymers, a dilute solution containing 0.01 to about 5 wt-% total fluoropolymer solids in a solvent is generally used. The coating solution can be applied to the porous gas-permeable material by conventional methods, for example, by roll-coating, immersion (dipping), spraying, or the like. The coating solution impregnates the porous material, wetting both the internal and external surfaces of the material. The solvent is subsequently removed by conventional drying methods, for example, by heating in the range 50° to 200° C., preferably in the range 100° to 150° C., and the compound comprising the fluoropolymers forms a thin oil- and water-repellent coating on the internal and external surfaces of the porous material. It is important to the function of the filter that the porous material remain gas-permeable after the fluoropolymer has been applied. Thus, depending on the material, pore size, pore volume, thickness, etc., of the porous material, some experimentation may be required to optimize the coating solution with respect to solids concentration, solvent selected, etc., in order to obtain an oil- and water-repellent coating that minimally influences such properties in order to preserve gas-permeability, yet provides the desired level of oil- and water-repellency.

TEST DESCRIPTIONS

Air Permeability (Gurley Number Method)

The resistance of samples to air flow was measured by an Oken model permeability tester. Test methods are described in reference standards ASTM D726-58, TAPPI T460, JIS P8117, and JIS L1096.

The results are reported in terms of Gurley Number which is the time (in seconds) for 100 cubic centimeters of air to pass through 1 square inch (6.45 sq. cm) of a test sample at a pressure drop of 4.88 inches (12.4 cm) of water.

Water Penetration Test

Samples of materials are tested for water penetration using water entry pressure (WEP) challenge. The test consists essentially of forcing water against one side of a test piece, and observing the other side of the test piece for indications of water penetration through it. Test Methods are described in reference standards JIS K6328 and JIS L1092.

The sample to be tested is clamped and sealed between rubber gaskets in a fixture that holds the test piece. The outer surface of the test piece faces upward and is open to the atmosphere, and to close observation. A piece of pH paper is placed on the outside surface of the test piece. The water pressure against the inner surface of the test piece is gradually increased, and the pH paper is watched closely for the appearance of any water forced through the material. Penetration of water through the test piece is indicated by a change in color of the pH paper, at which time the applied water pressure is recorded as the water entry pressure (WEP).

The water entry pressure is reported in kg/sq. cm.

Wetting Test

Test liquid, about 2–3 milliliters, is suspended in the form of liquid drops, by pipet or the like, on the surface of a horizontally positioned sample of porous test material to visually assess the wet state and the extent of infiltration of the liquid into the material. When wetted and penetrated by the test liquid, the samples generally change in appearance from opaque or semi-transparent to transparent.

Test liquids used were ethanol, isopropyl alcohol (IPA), toluene, acetone, methyl ethyl ketone (MEK).

Oil Penetration Test

The test is conducted as described above in the Water Penetration Test except that motor oil is substituted in place of water.

Results reported combine visual observations, test pressure, and time at test pressure.

Oil Stain Test

Drops of torque converter oil are applied to the surface of a horizontally positioned test piece, and allowed to stand for 20 hours at 60° C. The oil is then washed from the surface with isopropyl alcohol (IPA) and the test piece is air added.

The surface of the test piece is then visually inspected for stains and the observations reported.

Household Detergent Penetration Test

The test is conducted as described above in the Water Penetration Test except that an aqueous solution of Lion's "Mama Lemon" household detergent is substituted in place of water. The solution is prepared at twice the standard concentration.

Results reported combine visual observations, test pressure, and time at test pressure.

Household Detergent Wash Test

A 5 cm×5 cm test piece is folded in four and immersed in a solution of household detergent in a plastic container. The household detergent solution is Lion's "Mama Lemon" detergent diluted 10:1 in water. The container is shaken by a shaker for ten minutes at a rate of 80 RPM. The test piece is then removed from the container, thoroughly rinsed with water to remove the detergent solution, and air-dried.

After drying, the test piece is tested for wetting by application of drops of isopropyl alcohol (IPA) to the surfaces of the test piece representative of both the inner and outer surfaces of the folded piece. The visual observations of the wetting test are reported.

Without intending to limit the scope of the invention, the following examples demonstrate how the present invention may be made and used.

Polymer I Synthesis

A Type A fluoropolymer, i.e., a fluoropolymer having a fluorine-containing aliphatic cyclic structure in the main chain was prepared as follows:

Into a 200 ml pressure-tight glass autoclave were charged:

30 g perfluorobutenyl vinyl ether 120 g deionized water 4.8 g methanol 76 mg $((CH_3)_2CHOCOO)_2$ polymerization initiator The system was evacuated and back-filled with nitrogen three times. Suspension polymerization was carded out for 22 hours at 40° C. The polymer obtained was isolated, heat treated at 300° C., and washed with water. An amount of 26 g Polymer I was produced. At room temperature, the polymer was a tough, transparent, glass-like material. The glass transition temperature (Tg) was 108° C. The intrinsic viscosity ($\eta$) was 0.34 at 30° C. in perfluoro-(2-butyltetrahydrofuran). The polymer had a high light transmittance of 95%.

Polymer II Synthesis

A Type B fluoropolymer, i.e., a fluoropolymer containing polyfluoroalkyl groups was prepared as follows:

Into a pressure-tight ampule were charged:

5 g fluoroacrylate ($CH_2=CHCOOCH_2CH_2C_nF_{2n+1}$, where average n=9)

68 g 1,1,2-trifluorotrichloroethane 0.52 g azoisobutyronitrile (polymerization initiator)

The system was evacuated and back-filled with nitrogen three times. Polymerization was then carried out for 15 hours at 60° C.

An amount of 2.2 g Polymer II was produced. The number average molecular weight of the polymer was about 10,000.

Polymer III synthesis

A Type B fluoropolymer, i.e., a fluoropolymer containing polyfluoroalkyl groups was prepared as follows:

Into a pressure-tight ampule were charged:

15 g fluoroacrylate ($CH_2$=$CHCOOCH_2CH_2CnF_{2n+1}$, where average n=9)

0.13 g stearyl acrylate 39 g 1,1,2-trifluorotrichloroethane 0.37 g stearyl mercaptane 0.26 g azoisobutyronitrile (polymerization initiator)

The system was evacuated and back-filled with nitrogen three times. Polymerization was then carried out for 15 hours at 60° C.

An amount of 12.3 g Polymer III was produced. The number average molecular weight of the polymer was about 100,000.

example 1

Coating Example—Nylon Plain-Weave Fabric

A coating solution containing Type A and Type B fluoropolymers was prepared by dissolving 0.6 pbw Polymer I and 0.4 pbw Polymer II in 100 pbw perfluoro-(2-butyltetrahydrofuran).

A nylon fabric having a weight of 1.7 oz/sq. yd (57.6 $g/m^2$), in a plain-weave of 70 denier yarn; with a warp yarn count of 106 yarns/in. (42 yarns/cm) and a weft yarn count of 86 yarns/in. (34 yarns/cm), was dip-coated in the coating solution and dried for 10 minutes at 60° C.

Samples of the coated and uncoated nylon fabric were tested for air permeability, wetting, and household detergent penetration by the tests described above. Test results are shown in Table 1.

EXAMPLE 2

Comparative Example—Nylon Fabric

A comparative example was prepared as described in Example 1 above, except that the coating solution contained 1.0 pbw Type A Polymer I dissolved in 100 pbw perfluoro-(2-butyltetrahydrofuran).

A sample of the material was tested as described in Example 1 above, and the results are shown in Table 1.

EXAMPLE 3

Coating Example—Filter Paper

A coating solution containing Type A and Type B fluoropolymers was prepared by dissolving 0.6 pbw Polymer I and 0.4 pbw Polymer II in 100 pbw perfluoro-(2-butyltetrahydrofuran).

Filter paper (Advantec Toyo Co., No. 131-15; made according to JIS P3801) 250 micrometers thick and weighing 140 $g/m^2$, was dip-coated in the coating solution and dried for 10 minutes at 60° C.

Samples of the coated and uncoated filter paper were tested for wetting according to the wetting test described above.

A second sample portion of the coated and uncoated filter paper of the example were coated with motor oil for a period of one hour, after which the motor oil was removed and the sample tested for water penetration resistance by the test described above. Test results are shown in Table 2.

EXAMPLE 4

Comparative Example—Filter Paper

A comparative example was prepared as described in Example 3 above, except that the coating solution contained 1.0 pbw Type A Polymer I dissolved in 100 pbw perfluoro-(2-butyltetrahydrofuran).

A sample of the material was tested as described in Example 3 above, and the results are shown in Table 2.

TABLE 1

| | | EXAMPLE 1 | EXAMPLE 2 | UNTREATED |
|---|---|---|---|---|
| A) Gurley number(seconds) | | 0.25 | 0.26 | 0.25 |
| B) Wetting Properties | Ethanol | No wetting after 1 hr | No wetting after 1 hr | Wetted immediately |
| | IPA | No wetting after 1 hr | No wetting after 1 hr | Wetted immediately |
| C) Water Resistance to contamination from detergent | | No water leaks at 0.1 $kg/cm^2$ 1 min. | No water leaks at 0.1 $kg/cm^2$ 1 min. | Water leaked immediately |

TABLE 2

|  |  | EXAMPLE 3 | EXAMPLE 4 | UNTREATED |
| --- | --- | --- | --- | --- |
| A) Wetting Properties | IPA | No wetting after 1 hr | No wetting after 1 hr | Wetted immediately |
|  | MEK | No wetting after 1 hr | Wetted immediately | Wetted immediately |
| B) Water Resistance after contact with motor oil |  | No water leaks at 0.1 kg/cm² 1 min. | Water leakage at 0.05 kg/cm² | Water leakage at 0 kg/cm² |

EXAMPLE 5

Coating Example—Porous PTFE Membrane

A coating solution containing Type A and Type B fluoropolymers was prepared by dissolving 0.6 pbw Polymer I and 0.4 pbw Polymer III in 100 pbw perfluoro-(2-butyltetrahydrofuran).

A porous polytetrafluoroethylene membrane about 1 millimeter thick, bulk density of about 0.4 g/cc, pore volume of 80%, and a nominal pore size of 1.0 micrometers (manufactured by Japan Gore-Tex, Inc.) was dip-coated in the coating solution and dried for 10 minutes at 150° C.

Samples of the coated and uncoated porous PTFE membrane were tested for air permeability, wetting, and oil penetration resistance according to the tests described above. Test results are shown in Table 3.

EXAMPLE 8

Comparative Example—Porous PTFE Membrane

A comparative example was prepared as described in Example 5 above, except that the coating solution contained 1.0 pbw Type A Polymer I dissolved in 100 pbw perfluoro-(2-butyltetrahydrofuran).

A sample of the material was tested as described in Example 5 above, and the results are shown in Table 3.

EXAMPLE 7

Coating Example—Porous PTFE Membrane/Polyester Non-Woven Fabric Laminate

A coating solution containing Type A and Type B fluoropolymers was prepared by dissolving 0.6 pbw Polymer I and 0.4 pbw Polymer III in 100 pbw perfluoro-(2-butyltetrahydrofuran).

A porous composite material consisting of a porous polytetrafluoroethylene membrane about 40 micrometers thick, bulk density of about 0.4 g/cc, pore volume of 80%, and a nominal pore size of 3.0 micrometers (manufactured by W. L. Gore & Associates, Inc.) laminated to a non-woven polyester fabric 150 micrometers thick (Reemay #2275, manufactured by Reemay Corp.) was dip-coated in the coating solution and dried for 10 minutes at 150° C.

Samples of the coated and uncoated porous PTFE membrane were tested for air permeability, water penetration, wetting, oil penetration resistance, and household detergent penetration resistance according to the tests described above. Test results are shown in Table 4.

EXAMPLE 8

Comparative Example—Porous PTFE Membrane/Polyester Non-Woven Fabric Laminate A comparative example was prepared as described in Example 7 above, except that the coating solution contained 1.0 pbw Type A Polymer I dissolved in 100 pbw perfluoro-(2-butyltetrahydrofuran).

A sample of the material was tested as described in Example 7 above, and the results are shown in Table 4.

TABLE 3

|  |  | EXAMPLE 5 | EXAMPLE 6 | UNTREATED |
| --- | --- | --- | --- | --- |
| A) Gurley number (seconds) |  | 3.05 | 2.60 | 11.15 |
| B) WEP (kg/cm²) |  | 0.40 | 0.38 | 0.58 |
| C) Wetting Properties | Ethanol | No wetting after 1 hr | No wetting after 1 hr | Wetted immediately |
|  | IPA | No wetting after 1 hr | Wetted immediately | Wetted immediately |
|  | Toluene | No wetting after 1 hr | Wetted immediately | Wetted immediately |
|  | Acetone | No wetting after 1 hr | No wetting after 1 hr | Wetted immediately |
|  | MEK | No wetting after 1 hr | Wetted immediately | Wetted immediately |
| D) Oil Resistance to motor oil |  | No oil leaks at 0.1 kg/cm² 1 min | Oil leakage at 0.1 kg/cm² 1 min | Oil leak at 0.1 kg/cm² 30 sec. |

TABLE 4

|  |  | EXAMPLE 7 | EXAMPLE 8 | UNTREATED |
| --- | --- | --- | --- | --- |
| A) Gurley number (seconds) |  | 1.15 | 0.97 | 0.34 |
| B) WEP (kg/cm$^2$) |  | 0.74 | 0.67 | 0.44 |
| C) Wetting Properties | Ethanol | No wetting after 1 hr | No wetting after 1 hr | Wetted immediately |
|  | IPA | No wetting after 1 hr | Wetted immediately | Wetted immediately |
|  | Toluene | No wetting after 1 hr | Wetted immediately | Wetted immediately |
|  | Acetone | No wetting after 1 hr | No wetting after 1 hr | Wetted immediately |
|  | MEK | No wetting after 1 hr | Wetted immediately | Wetted immediately |
| E) Oil Resistance to motor oil |  | No oil leakage at 0.1 kg/cm$^2$ 1 min. | Oil leakage at 0.1 kg/cm$^2$ 10 sec. | Oil leaked immediately |
| F) Water resistance to household detergent |  | No water leakage at 0.2 kg/cm$^2$ 1 min | Water leakage at 0.2 kg/cm$^2$ 10 sec. | Water leaked immediately |

EXAMPLE 9

Coating Example—Porous PTFE Membrane

A coating solution containing Type A and Type B fluoropolymers was prepared by dissolving 0.2 pbw Polymer I and 0.8 pbw Polymer III in 100 pbw perfluoro-(2-butyltetrahydrofuran).

A porous polytetrafluoroethylene membrane about 40 micrometers thick, bulk density of about 0.2 g/cc, pore volume of 90%, and a nominal pore size of 3.0 micrometers (manufactured by Japan Gore-Tex, Inc.) was dip-coated in the coating solution and dried for 10 minutes at 150° C.

Samples of the coated and uncoated porous PTFE membrane were tested for oil stain resistance according to the test described above, after which they were given a wetting test by application of drops of isopropyl alcohol.

Test results are shown in Table 5.

EXAMPLE 10

Coating Example—Porous PTFE Membrane

A coating example was prepared and tested as described in Example 9 above, except that the solution containing Type A and Type B fluoropolymers was prepared by dissolving 0.6 pbw Polymer I and 0.4 pbw Polymer III in 100 pbw perfluoro-(2-butyltetrahydrofuran). Test results are shown in Table 5.

EXAMPLE 11

Comparative Example—Porous PTFE Membrane

A comparative example was prepared and tested as described in Example 9 above, except that the coating solution contained 1.0 pbw Type A Polymer I dissolved in 100 pbw perfluoro-(2-butyltetrahydrofuran).

Test results are shown in Table 5.

TABLE 5

|  | STAIN | IPA WETTING PROPERTIES |
| --- | --- | --- |
| Example 9 | None | Repellent |
| Example 10 | None | Repellent |
| Example 11 | Stained | Saturated |
| Untreated | Stained | Rapidly Saturated |

EXAMPLE 12

Coating Example—Porous PTFE Membrane

A coating solution containing Type A and Type B fluoropolymers was prepared by dissolving 0.6 pbw perfluoro-(2,2-dimethyl-1,3-dioxole)/tetrafluoroethylene copolymer and 0.4 pbw Polymer III in 100 pbw perfluoro-(2-butyltetrahydrofuran).

A porous polytetrafluoroethylene membrane about 40 micrometers thick, bulk density of about 0.2 g/cc, pore volume of 90%, and a nominal pore size of 3.0 micrometers (manufactured by Japan Gore-Tex, Inc.) was dip-coated in the coating solution and dried for 10 minutes at 150° C.

Samples of the coated and uncoated porous PTFE membrane were tested for oil stain resistance according to the test described above, after which they were given a wetting test by application of drops of isopropyl alcohol.

Test results are shown in Table 6.

EXAMPLE 13

Comparative Example—Porous PTFE Membrane

A comparative example was prepared and tested as described in Example 12 above, except that the coating solution contained 1.0 pbw perfluoro-(2,2-dimethyl-1,3-dioxole)/tetrafluoroethylene copolymer dissolved in pbw perfluoro-(2-butyltetraahydrofuran).

Test results are shown in Table 6.

TABLE 6

|  | STAIN | IPA WETTING PROPERTIES |
| --- | --- | --- |
| Example 12 | None | Repellent |
| Example 13 | None | Slowly Saturated |
| Untreated | Stained | Rapidly Saturated |

EXAMPLE 14

Coating Example—Porous PTFE Membrane

A coating solution containing Type A and Type B fluoropolymers was prepared by dissolving 0.2 pbw Polymer I and 0.8 pbw Polymer III in 100 pbw perfluoro-(2-butyltetrahydrofuran).

A porous polytetrafluoroethylene membrane about 40 micrometers thick, bulk density of about 0.2 g/cc, pore volume of 90%, and a nominal pore size of 3.0 micrometers (manufactured by Japan Gore-Tex, Inc.) was dip-coated in the coating solution and dried for 10 minutes at 150° C.

Samples of the coated and uncoated porous PTFE membrane were tested for household detergent wash resistance according to the test described above.

Test results are shown in Table 7.

EXAMPLE 15

Coating Example—Porous PTFE Membrane

A coating example was prepared and tested as described in Example 14 above, except that the solution containing Type A and Type B fluoropolymers was prepared by dissolving 0.6 pbw Polymer I and 0.4 pbw Polymer III in 100 pbw perfluoro-(2-butyltetrahydrofuran). Test results are shown in Table 7.

EXAMPLE 16

Comparative Example—Porous PTFE Membrane

A comparative example was prepared and tested as described in Example 14 above, except that the coating solution contained 1.0 pbw Type A Polymer I dissolved in 100 pbw perfluoro-(2-butyltetrahydrofuran). Test results are shown in Table 7.

TABLE 7

|  | IPA WETTING (UNFOLDED PARTS) | IPA WETTING (FOLDED PARTS) |
|---|---|---|
| Example 14 | Repellent | Repellent |
| Example 15 | Repellent | Repellent |
| Example 16 | Rapidly Saturated | Rapidly Saturated |
| Untreated | Rapidly Stained | Rapidly Saturated |

EXAMPLE 17

Coating Example—Porous PTFE Membrane

A coating solution containing Type A and Type B fluoropolymers was prepared by dissolving 0.6 pbw perfluoro-(2,2-dimethyl-1,3-dioxole)/tetrafluoroethylene copolymer and 0.4 pbw Polymer III in 100 pbw perfluoro-(2-butyltetrahydrofuran).

A porous polytetrafluoroethylene membrane about 40 micrometers thick, bulk density of about 0.2 g/cc, pore volume of 90%, and a nominal pore size of 3.0 micrometers (manufactured by Japan Gore-Tex, Inc.) was dip-coated in the coating solution and dried for 10 minutes at 150° C.

Samples of the coated and uncoated porous PTFE membrane were tested for household detergent wash resistance according to the test described above.

Test results are shown in Table 8.

EXAMPLE 18

Comparative Example—Porous PTFE Membrane

A comparative example was prepared and tested as described in Example 17 above, except that the coating solution contained 1.0 pbw perfluoro-(2,2-dimethyl-1,3-dioxole)/tetrafluoroethylene copolymer dissolved in 100 pbw perfluoro-(2-butyltetrahydrofuran).

Test results are shown in Table 8.

TABLE 8

|  | IPA WETTING (UNFOLDED PARTS) | IPA WETTING (FOLDED PARTS) |
|---|---|---|
| Example 17 | Repellent | Repellent |
| Example 18 | Slowly Saturated | Rapidly Saturated |
| Untreated | Rapidly Stained | Rapidly Saturated |

It is clear from examination of the test results tabulated above that the combination of Type A fluoropolymers, containing a fluorine-containing aliphatic cyclic structure in the main chain, with Type B fluoropolymers, containing polyfluoroalkyl groups, to form a coating compound applied, without impairment of gas-permeability, to porous materials, imparts superior oil- and water-repellent properties than can be obtained by application of such fluoropolymers singly.

In addition to uses discussed earlier, filters of the invention formed of the above described materials have great utility in other applications where oils, fats, lipids, and other low surface tension liquids may be encountered. For example, as vent filters for liquid containers such as gasoline tanks, oil tanks, chemical vessels, and the like; or as vent filters in medical and sanitary applications such as blood separation apparatus, medication drip bottles, infant nursing bottles, and the like, where air or other gases must be filtered and vented in the course of filling or emptying the containers.

We claim:

1. An oil- and water-repellent gas-permeable filter comprising:
   (a) a gas-permeable material having a structure containing passageways therethrough, said material having its internal and external surfaces coated with a compound comprising
      (i) a fluoropolymer A having a fluorine-containing aliphatic cyclic structure in the main chain, and
      (ii) a fluoropolymer B containing polyfluoroalkyl groups,
   wherein the relative concentration of the fluoropolymers is in the range 1 weight part A to 0.01–100 weight parts B.

2. The oil- and water-repellent gas-permeable filter as recited in claim 1, wherein the fluoropolymer B contains at least 80 wt % (meth)acrylate monomer groups having $C_nF_{2n+1}$ (where n=4 to 20) as the polyfluoroalkyl groups.

3. The oil- and water-repellent gas-permeable filter as recited in claim 1, wherein the gas-permeable material is selected from the class consisting of woven fabric, knitted fabric, non-woven fabric, netting, felt, porous synthetic polymer sheets, cellulosic papers, and fiberglass papers.

4. The oil- and water-repellent gas-permeable filter as recited in claim 2, wherein the gas-permeable material is selected from the class consisting of woven fabric, knitted fabric, non-woven fabric, netting, felt, porous synthetic polymer sheets, cellulosic papers, and fiberglass papers.

5. The oil- and water-repellent gas-permeable filter as recited in claim 1, 2, 3, or 4, wherein the gas-permeable material is polytetrafluoroethylene.

6. The oil- and water-repellent gas-permeable filter as recited in claim 1, wherein the gas-permeable material is a composite material comprising a porous polytetrafluoroethylene membrane laminated to a material selected from the class consisting of woven fabric, knitted fabric, non-woven fabric, netting, felt, porous synthetic polymer sheets, cellulosic papers, and fiberglass papers.

* * * * *